United States Patent

[11] 3,624,143

| [72] | Inventors | Tsung-Ying Shen<br>Westfield;<br>Gordon L. Walford, Westfield; Conrad P. Dorn, Jr., Plainfield, all of N.J. |
|---|---|---|
| [21] | Appl. No. | 728,351 |
| [22] | Filed | May 10, 1968 |
| [45] | Patented | Nov. 30, 1971 |
| [73] | Assignee | Merck & Co. |

[54] COMPOUNDS OF THE CLASS $\beta$-ARALKYLTHIO-SUBSTITUTED-$\alpha$-AMINO ACIDS
9 Claims, No Drawings

[52] U.S. Cl.................................... 260/516,
260/244 R, 260/247.1, 260/268 R, 260/293.4 R,
260/294.8 G, 260/309.5, 260/379 S, 260/332.2 R,
260/347.2, 260/429.9, 260/438.1, 260/448 R,
260/405 F, 260/470, 260/546, 260/558, 260/559
T, 260/592, 260/599, 260/6.9 R, 260/611 A,
260/618 R, 424/319, 424/324, 424/248, 424/267,
424/274, 424/285, 424/309, 424/315
[51] Int. Cl....................................... C07c 149/42
[50] Field of Search............................. 260/516,
470

[56] References Cited
UNITED STATES PATENTS

| 2,900,375 | 8/1959 | Amiard ......................... | 260/112 |
| 2,430,455 | 11/1947 | Crooks.......................... | 260/470 |

FOREIGN PATENTS

| 6,500,849 | 7/1965 | Netherlands |

OTHER REFERENCES

Thibert et al. Canadian J. of Chem. V. 43 p. 206– 210 (1965)

Primary Examiner—Lorraine A. Weinberger
Assistant Examiner—Edward Jay Gleiman
Attorneys—Michael C. Sudol, Jr., Harry E. Westlake, Jr. and I. Louis Wolk ABSTRACT: $\beta$-Aralkylthio-substituted-$\alpha$-amino acids and derivatives thereof useful as antiinflammatory agents are described.

A process for preparing some of these amino acids by reaction of the corresponding aldehydes or ketones in the Strecker or hydantoin synthesis is shown.

3,624,143

COMPOUNDS OF THE CLASS β-ARALKYLTHIO-SUBSTITUTED-α-AMINO ACIDS

CROSS REFERENCES TO RELATED APPLICATIONS

U.S. Ser. No. 656,041, now abandoned.

SUMMARY OF THE INVENTION

This invention relates to certain β-aralkyl-thio-substituted-α-amino acids and their corresponding esters and amides.

This invention also relates to intermediate aldehydes, ketones and acetals used in the preparation of these final products, as well as a process for the preparation of these various compounds. More particularly, the invention relates to mono-, di- and tri(aralkyl)thio-substituted-α-amino acids and their derivatives and to their pharmaceutical preparations. Still more particularly, this invention is concerned with a method of treating inflammation with compounds of the following general formula:

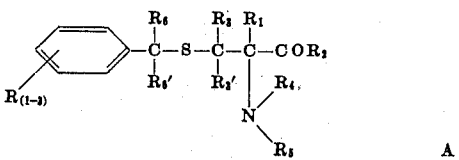

wherein R may be hydrogen, mercapto, cyano, lower alkylsulfonyl (methylsulfonyl, propylsulfonyl), lower alkylsulfinyl (methylsulfinyl, propylsulfinyl), lower alkanoyl (acetyl, propionyl), trifluoroacetyl, halo lower alkyl (trifluoromethyl, dichloromethyl, chloroethyl), sulfamyl, dilower alkylsulfamoyl (dimethylsulfamyl, ethylpropylsulfamyl), carbamyl, dilower alkylcarbamyl (dimethylcarbamyl, ethylbutylcarbamyl), hydroxy, halogen (chloro, bromo, fluoro), lower alkylthio (methylthio, propylthio, butylthio), lower alkoxy (methoxy, ethoxy, butoxy, pentoxy), anisyl, phenyl, nitro, phenethyl, lower alkyl (methyl, ethyl, propyl, pentyl), methylenedioxy, anilino, N-lower alkylanilino (N-methyl, N-propyl, N-butyl), lower alkylphenyl (methylphenyl, propylphenyl, pentylphenyl), dilower alkylamino (dimethylamino, ethylpropylamino, dibutylamino), cyclohexyl, phenoxy, amino, acylamino, lower alkylamino (methylamino, ethylamino, butylamino) or lower alkenyl (1-propenyl, 2-butenyl). The R substituent may be attached to any one or more of the available positions of a phenyl or naphthyl moiety.

$R_2$ may be hydroxy, lower alkoxy (methoxy, ethoxy, butoxy), lower alkenyloxy (prop-2-enoxy, but-3-enoxy), lower alkynyloxy (prop-1-ynoxy, pent-2-ynoxy), cyclopropylmethyloxy, lower alkoxy lower alkoxy (methoxymethoxy, ethoxypropoxy, methoxybutoxy), polylower alkoxy lower alkoxy (such as the polyalkyl ethers derived from sorbitol, mannitol or other sugar alcohols containing up to six carbon atoms in the basic chain), dilower alkylamino lower alkoxy (dimethylaminoethoxy, dipropylaminopropoxy), piperidino lower alkoxy (such as ethoxy, propoxy, pentoxy), 1-pyrrolidinyl lower alkoxy (such as ethoxy, propoxy, pentoxy), morpholino lower alkoxy (such as ethoxy, propoxy, pentoxy), 1-lower alkyl-2-pyrrolidinyl lower alkoxy (such as the methyl-methoxy, ethyl-propoxy, propyl-ethoxy or methyl-butoxy radicals), 1-lower alkyl-2-piperidinyl lower alkoxy (such as the methyl-methoxy, ethyl-propoxy, propyl-ethoxy or methyl-butoxy radicals), N'-lower alkyl-N-piperazinyl lower alkoxy (such as the methyl-methoxy, ethyl-propoxy, propyl-ethoxy or methyl-butoxy radicals), phenoxy, p-lower alkanoylamino phenoxy (acetamido phenoxy), phenyl lower alkoxy (phenyl-methoxy, phenyl-ethoxy, 2-phenylpropoxy), carbamyl phenoxy, lower alkoxyphenyl lower alkoxy (such as the methoxy-ethoxy, ethoxy-propoxy or ethoxy-ethoxy substituents), phenyl lower alkenyloxy (such as phenyl ethylenoxy, phenyl prop-2-enoxy), tetrahydrofurfuryloxy, dilower alkylamino cyclohexyloxy (3-dimethylamino-cyclohexyloxy, 2-ethylbutylamino-cyclohexyloxy), amino, lower alkylamino (methylamino, propylamino, butylamino), dilower alkylamino (methylethylamino, ethylpropylamino, dimethylamino), glucosamino, glycosylamino, lower alkenylamino (prop-2-enamino, but-3-enamino), phenyl lower alkylamino (phenethylamino, phenyl propylamino), haloanilino (chloroanilino, bromoanilino), (1-lower alkyl piperidinyl-2)-lower alkylamino (such as the methyl-methyl, methyl-ethyl, propyl-propyl groups of this radical), tetrahydrofurfurylamino, 1,2,5,6-tetrahydropyridino, morpholino, N'-lower alkyl-N-piperazinyl (N-methyl, N-propyl, N-butyl), piperazino, N-phenyl piperazino, piperidino, benzylamino, anilino, lower alkoxyanilino (ethoxy, propoxy, butoxy), cyclo lower alkylamino (cyclobutylamino, cyclohexylamino), pyrrolidino, N-hydroxy lower alkyl piperazino (N-hydroxymethyl, N-hydroxypropyl, N-hydroxypentyl), N,N-dilower alkyl carbamyl lower alkylamino (such as dimethyl, methyl-ethyl, propylbutyl for the dilower alkyl, and methyl, ethyl, butyl, pentyl for the lower alkyl), N,N-dilower alkylamino lower alkylamino (such as dimethyl, methyl- ethyl, propylbutyl for the dilower alkyl, and methyl, ethyl, butyl, pentyl for the lower alkyl), 1-lower alkyl pyrrolidino-2-lower alkylamino (such as methyl, ethyl, propyl, butyl for the lower alkyl groups), N-carbobenzyloxy lower alkylamino (such as methyl, ethyl, butyl for the lower alkyl); $R_2$ may also include OZ where Z is a cation (such as iron, aluminum, magnesium, potassium, sodium, and the like) and the symmetrical anhydrides of the acids.

$R_3$ and $R_3'$ may be hydrogen, lower alkyl (methyl, ethyl, propyl, pentyl, butyl) or phenyl.

$R_1$ may be hydrogen, lower alkyl (methyl, propyl, pentyl, butyl) or phenyl.

$R_4$ and $R_5$ may be hydrogen, lower alkyl (methyl, propyl, pentyl, butyl), phenyl or guanyl when $R_5$ is hydrogen.

$R_6$ and $R_6'$ may be hydrogen, lower alkyl (methyl, propyl, butyl), lower alkenyl (allyl), phenyl, naphthyl, thienyl, pyridyl or a substituted phenyl and naphthyl in which the substituents may be $R_{(1-3)}$ and that $R_6$ and $R_6'$ may be the same or different.

The novel compounds of this invention have the general formula A, where the various definitions are as shown above with the following limitations:

When $R_6$ and $R_6'$ are both phenyl at the same time, then at least one of R, $R_1$, $R_3$, $R_3'$, $R_4$ and $R_5$ is other than hydrogen and $R_2$ is as indicated above.

When $R_6'$ is phenyl, then at least one of $R_1$, $R_3$, $R_3'$, $R_4$, $R_5$ and $R_6$ is other than hydrogen when R is hydrogen or alkoxy and R is monosubstituted and $R_2$ is as indicated above.

When $R_6'$ is hydrogen, then at least one of $R_1$, $R_3$, $R_3'$, $R_4$, $R_5$ and $R_6$ is other than hydrogen when R is hydrogen, alkoxy, nitro, halo or alkenyl and R is monosubstituted.

When $R_4$ is alkanoyl, at least one of R, $R_1$, $R_3$, $R_3'$, $R_5$ and $R_6$ is other than hydrogen, and $R_2$ is as indicated above, and $R_6'$ is hydrogen.

In its more preferred aspects, this invention is directed to the compounds of this invention as shown above in formula A, and have the following particularly preferred substituents:

R may be hydrogen, halogen, trifluoromethyl, methylthio, trifluoroacetyl, dimethylcarbamyl or methoxy; $R_1$ may be hydrogen, methyl or phenyl;

$R_2$ may be hydroxy, ethoxy, or OM where M is a pharmaceutically acceptable metal ion such as sodium, magnesium, calcium, aluminum, copper, zinc or choline;

$R_3$ and $R_3'$ may be hydrogen, methyl or phenyl;

$R_4$ and $R_5$ may be hydrogen, methyl or guanyl; and $R_6$ and $R_6'$ may be hydrogen, phenyl, naphthyl or substituted phenyl, and $R_6$ and $R_6'$ may be the same or different.

The most preferred aspects of this invention are directed to compounds of formula A where:

R may be hydrogen or halogen;
$R_1$ may be hydrogen or methyl;
$R_2$ is hydroxy;
$R_3$, $R_3'$, $R_4$ and $R_5$ are hydrogen; and
$R_6$ and $R_6'$ may be hydrogen, phenyl, naphthyl or halophenyl, provided that at least one of R, $R_1$, $R_3$, $R_3'$, $R_4$ and $R_5$ is other than hydrogen when $R_6$ and $R_6'$ are both phenyl.

Representative compounds of this invention are as follows:
S-(3,4-dichlorobenzyl)-L-cysteine S-(3,4-dichlorobonzl)-α-methylcysteine
S-(3,4-dichlorobenzl)-α-phenylcysteine
S-(4,4-dichloro)-trityl-L-cysteine
S-tris(4-fluorophenyl)methyl-L-cysteine
S-tris(m-sluorophenyl)methyl-β-ethyl-DL-cysteine
S-tris(m-fluorophenyl)methyl-β-ethyl-α-phenyl-DL-cysteine
S-(p-chlorophenyldiphenylmethyl)-L-cysteine
S-(α-naphthyldiphenylmethyl)-L-cysteine
S-(p-chlorophenyldiphenylmethyl)-L-cysteineamide
S-(p-chlorophenyldiphenylmethyl)-L-cysteine methyl ester
S-(2'-thienyldiphenylmethyl)-L-cysteine
S-(4'-pyridyldiphenylmethyl)-L-cysteine
S-(α-naphthylphenylmethyl)-L-cysteine It has been found that compounds of the above structure have a high degree of anti-inflammatory activity and are effective in the prevention and inhibition of delayed hypersensitivity. The compounds of this invention possess a favorable degree of activity and are of value in the treatment of arthritic and dermatological disorders which are responsive to treatment with anti-inflammatory agents. For these purposes, the compounds may be administered in tablets or capsules, or other pharmaceutical preparations, the optimum dose depending upon the activity of the particular compound used and the severity and type of infection being treated. Although the optimum dose will depend upon the particular compound and the particular disease being treated, oral dose levels of 10–5,000 mg. per day may be usefully employed but dose levels of 50–1,000 mg. are generally preferred.

The α-amino acid compounds of this invention may also be employed in pharmaceutical preparations with various salicylates, such as aspirin. These preparations may contain 0.1–8.0 g. of aspirin and 0.5–10.0 g. of the α-amino acid compound. Preferably, these preparations may contain ca. 250 mg. of the α-amino acid compound and ca. 300 mg. of aspirin, together with excipients. These excipients may be, for example, inert diluents such as calcium carbonate, sodium carbonate, lactose, calcium phosphate or sodium phosphate; granulating and disintegrating agents, for example, maize starch or alginic acid; binding agents, for example, starch, gelatin or acacin; and lubricating agents, for example, magnesium stearate, stearic acid or talc.

The antirheumatic property of penicillamine has been described in the literature. The mechanism of action is still not fully understood. According to A. Lorber [Nature, 210, 1235 June 18, 1966)], chelation with divalent metals, such as copper, and participation of the free sulfhydryl group in an exchange dissociation with disulfide linked immune globulins in vivo are two possible modes of action. It is well-known that a free sulfhydryl group is generally preferred than thioethers as metal complexing ligands and thioethers are incapable of forming disulfide bonds in vivo. Thus, it was unexpected to find that a number of aralkyl thioethers, which are not known to form sulfhydryl metabolites in vivo, actually possess superior antirheumatic activities than that of penicillamine.

Accordingly, this invention is directed to novel aralkyl thioethers as well as known aralkyl thioethers which possess this unexpected anti inflammatory property.

The compounds of this invention exist as racemates or their optically active −1 or +d form. For the purposes of this invention, the compounds may be employed as their racemates or optically active forms.

DETAILED DESCRIPTION

The α-amino acids of the present invention are conveniently prepared by the following methods.

METHOD I

From the corresponding α-aminonitriles

α-Aminonitriles may be hydrolyzed to the desired free α-amino acids. This reaction may be carried out by any well-known hydrolysis reaction for nitriles, for example, with an acid in the presence of water (preferably a mineral acid) at elevated temperatures (preferably at or near the reflux temperature of the system.) Any acid, both organic or inorganic, which is soluble in water may be used. Representative acids of this class are hydrochloric, sulfuric, and the like. The following equation illustrates this method of preparation:

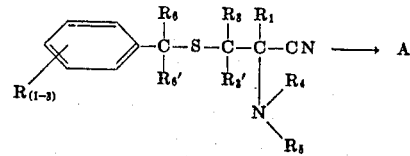

where R, $R_1$, $R_3$, $R_3'$, $R_4$, $R_5$, $R_6$ and $R_6'$ are as previously defined.

METHOD II

From the corresponding hydantoin compound

Hydrolysis of hydantoin compounds under well-known conditions to α-amino acids, is effected by various reagents in acid or basic mediums. Treatment with most alkali or alkaline earth hydroxides or strong acids, using mild reaction conditions, will afford the desired products. The following equation illustrates this method of preparation:

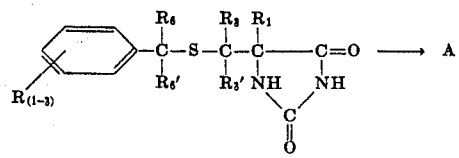

where R, $R_1$, $R_3$, $R'_3$, $R_6$ and $R'_6$ are as previously defined and $R_4$ and $R_5$ are hydrogen.

METHOD III

From an α-substituted benzylmercaptan

Reaction of an α-substituted benzylmercaptan with the proper halo α-amino propionic acid at elevated temperatures, preferably at or near the reflux temperature of the system, in a solvent (preferably a polar solvent such as DMF, liquid ammonia, etc.). The following equation illustrates this method of preparation:

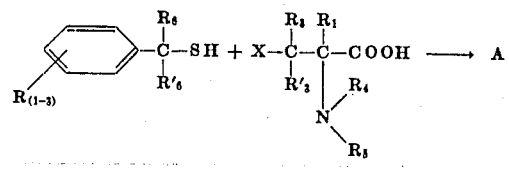

where R, $R_1$, $R_3$, $R'_3$, $R_4$, $R_5$, $R_6$ and $R'_6$ are as previously defined, and X is halogen.

METHOD IV

From an α-substituted benzyl halide

Reaction of an α-substituted benzyl halide with the proper cysteine at elevated temperatures, preferably at or near the reflux temperature of the system, in a solvent (preferably a polar solvent such as DMF, liquid ammonia, etc.). The following equation illustrates this method of preparation:

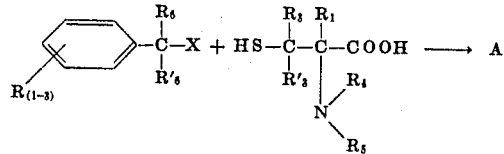

where R, $R_1$, $R_3$, $R'_3$, $R_4$, $R_5$, $R_6$ and $R'_6$ are as previously defined, and X is halogen.

A general method for making α-tris(aryl)thio-substituted-α-amino acids is to condense an appropriate triaryl alcohol with β-mercapto- α-amino acids directly in the presence of a Lewis acid such as $BF_3$ etherate in glacial acetic acid at elevated temperatures.

A convenient method for preparing an $R_1$- α-di-methyl amino acid is by reaction of the corresponding α-amino compound with formaldehyde in the presence of hydrogen over palladium. Alternatively, when an $R_1$- α-alkylamino acid is desired, another suitable process is the reaction of an appropriate α-amino acid with ammonia and sodium and a trace of ferric chloride. The product thus formed is treated with p-toluenesulfonyl chloride to form an α-toleuensulfonyl amino acid compound. This compound is then reacted with a base and an alkyl halide, followed by sodium and ammonia and an appropriate arylmethyl halide to form the desired α-amino acid final compound with the appropriate α-alkyl substituent.

The racemates may be converted to their −1 or +d form by any conventional method, such as forming a salt of the racemic amino acid with an optically active base or acid such as α-phenethylamine or tartaric acid. These optically active salts may be separated by fractional crystallization and converted back to the optically active α-amino acid by treatment with acid or base.

A general method of synthesis particularly useful in making the optically active isomers of the α-amino acids is the reductive transamination of an α-keto acid with an optically active amine. This procedure is more fully described in J. Org. Chem. 32, 1790–1794 (1967). Further, the method described may also be used to prepare the racemic α-amino acid by reductive transamination of an α-keto acid with ammonia. The method described in the above-stated article employs palladium-on-charcoal as the reducing agent; however, it is to be understood that other chemical reducing agents may similarly be employed.

The starting materials used in these foregoing methods can be conveniently prepared by the following reactions.

FLOW SHEET I

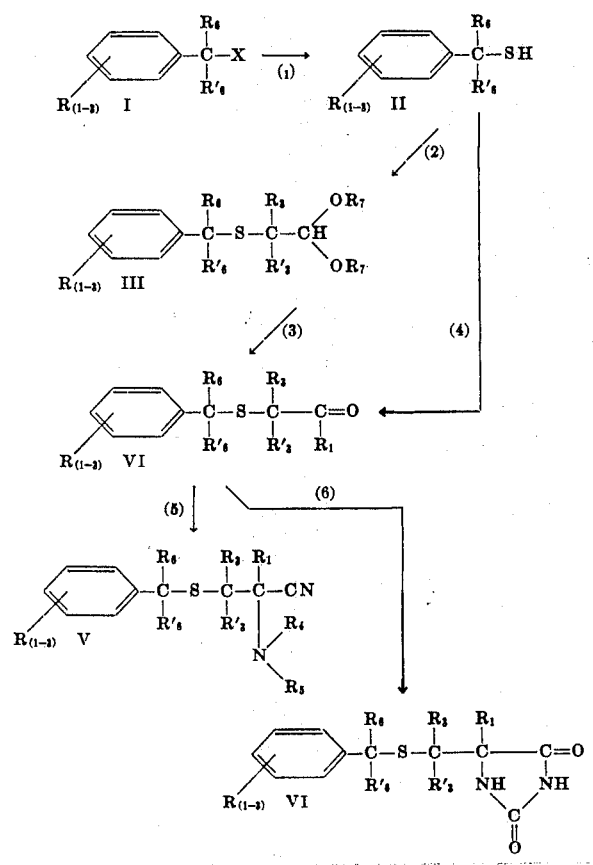

where R, $R_1$, $R_3$, $R'_3$, $R_4$, $R_5$, $R_6$ and $R'_6$ are as previously defined; $R_7$ is a lower alkyl, preferably methyl; and X is a halogen, preferably chloro.

The reaction conditions for these process steps are as follows:

Step 1 —reaction with hydrogen sulfide in the presence of an alkali or alkali earth hydrosulfide (preferably sodium hydrosulfide) in an inert solvent (preferably lower alkanols) at elevated temperatures, preferably at or near the reflux temperature of the system;

Step 2 —reaction with sodium in a lower alkanol followed by addition of a halo acetal of the formula

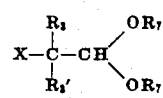

preferably a chloro acetal where $R_7$ is methyl, and reaction at elevated temperatures (preferably at or near the reflux temperature of the solvent);

Step 3 —hydrolysis, by any well-known methods for the conversion of acetals to their corresponding aldehydes. For example, reaction with a mineral acid (i.e., HCl, $H_2SO_4$) at elevated temperatures (preferably at or near the reflux temperature of the systems; $R_1$ of compound IV thus formed must be hydrogen.

Step 4 —same as Step 2, using equivalent amounts of ketones of the formula

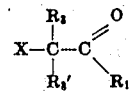

in place of the acetal, where X is a halogen (preferably chloro) and $R_1$ is as defined above, but other than hydrogen.

Step 5 —reaction by the well-known Strecker reaction, such as reaction with a mixture of ammonium chloride, an alkali cyanide and ammonia, lower alkylamines (ethylamine, butylamine and the like), dilower alkylamino (dimethylamine; ethylpropylamine and the like), phenylamine, or phenyl lower alkylamines (phenethylamine, phenyl-methylamine) at any suitable temperature, preferably at or near room temperature;

Step 6 —reaction under the well-known conditions for preparing a hydantoin compound from the corresponding aldehyde or ketone; for example, reaction in an inert solvent such as lower alkanols with a mixture of an alkali cyanide and ammonium carbonate at elevated temperatures.

The trityl carbinols are easily prepared by hydrolysis of the corresponding halo compounds with water or dilute bases following conventional techniques. The mono-, di- and triarylmethyl halides and the halo and mercapto cysteines are known.

The intermediate compounds III, IV, V and VI are new compounds and an additional aspect of this invention.

The desired α-amino acid esters may be directly prepared from the nitrile by using the proper alcohol in place of water in Method I. For example, if ethyl alcohol were used, the α-amino acid ethyl ester would be obtained. Furthermore, if desired, the corresponding primary amide may be obtained directly from the corresponding nitrile by carrying out the hydrolysis in water at temperatures at or below room temperature.

Alternatively, the desired esters or amides of this invention may be obtained by esterification of the corresponding free acid using the appropriate alcohol to obtain the desired ester moiety or by amidation of the ester compound with the appropriate amine to obtain the desired amide moiety. Any well-known reaction conditions may be used to prepare these esters or amides such as reaction of the α-amino acid with alcohol in the presence of the mineral acid at elevated temperature or reaction of an α-amino acid ester (such as an alkyl ester) with ammonia or an appropriate $R_2$ amine at temperatures at or below room temperature.

Desired esters and amides of this invention may further be prepared directly by methods III and IV.

Another convenient method for preparing an $R_1$ α-dimethylamino ester or amide is by reaction of the corresponding α-amino compound with formaldehyde in the presence of hydrogen over palladium as the α-dimethyl-amino acid is prepared.

The α-guanidino amino acid compounds of this invention may be prepared by reacting the appropriate α-amino acid compound with S-methylisothiourea sulfate in the presence of ammonia.

The following examples are given by way of illustration.

EXAMPLE 1

Tri-(m-fluorophenyl)methyl mercaptan

To a solution of sodium hydrosulfide prepared by saturating with hydrogen sulfide at room temperature, a solution of 1.15 grams (0.05 mole) sodium in 20 cc. isopropanol is added with cooling 0.05 mole of chlorotris(m-fluorophenyl)methane. The reaction mixture is stirred at room temperature overnight while hydrogen sulfide is slowly bubbled through it at a slow rate. The reaction mixture is heated to reflux for 15 minutes, cooled, poured into water and extracted well with chloroform. The combined chloroform extracts are washed well with water, dried over sodium sulfate, and concentrated. Chromatography of the residue on 1,500 grams of silica gel and elution with ether-petroleum ether (0–80 percent) gives tris-(m-fluorophenyl)methyl mercaptan.

A. When the triarylmethyl halides of table I below are used in place of chlorotris(m-flurophenyl)-methane in the above example, the corresponding triarylmethyl mercaptans are obtained.

TABLE I chlorobis(5-chloro-2-methylmercaptophenyl)phenyl methane
chlorobis(o-methylmercaptophenyl)phenyl methane
chlorobis(p-methylmercaptophenyl)phenyl methane
chloro(2,4-dimethoxyphenyl)diphenyl methane
chlorodiphenyl(p-tolylphenyl) methane
chloro(p-methylmercaptophenyl)diphenyl) diphenyl methane
chlorotris(5-chloro- 2-methylmercaptophenyl) methane
chlorotris[o-(ethylmercapto)-phenyl] methane
chlorotris(2-methyl-p-anisyl) methane
chlorotris(o-methylmercaptophenyl) methane
chlorotris(p-methylmercaptophenyl) methane
chlorotris(p-phenylphenyl) methane
chlorobis(2,4-dimethoxyphenyl)phenyl methane
chlorobis(p-nitrophenyl)phenyl methane
chloro(p-chlorophenyl)diphenyl methane
chloro(α-naphthyl)diphenyl methane
chloro(β-naphthyl)diphenyl methane
chloro(2'chloro(4'chlorodiphenyl(phenylphenyl) methane chloro(p-nitrophenyl)diphenyl methane
chloro(o-phenethylphenyl)diphenyl methane
chlorotris(p-ethylphenyl) methane
chlorotris(p-isobutylphenyl) methane
chlorotris[p-(p-phenoxyanilino)phenyl] methane
chlorotris[p-(p-phenylanilino)phenyl] methane
chlorotris[p-(p-phenylmercaptoanilino)phenyl] methane
chlorotris(p-propylphenyl) methane
bis(p-bromophenyl)chloro(p-chlorophenyl) methane
bis(p-bromophenyl)chlorophenyl methane
bis(p-sec-butylphenyl)chlorophenyl methane
bis(p-tert-butylphenyl)chlorophenyl methane
bis(p-tert-butylphenyl)chloro-m(and o)-tolyl methane
bis(p-tert-butylphenyl)chloro-p-tolyl methane
bromo(o-methoxyphenyl)-(p-methoxyphenyl)phenyl methane
bromo(4-methoxy-m-tolyl)diphenyl methane
bromo(m-nitrophenyl)diphenyl methane
(m-bromophenyl)-bis(p-tert-butylphenyl)chloro methane
(o-bromophenyl)chlorodiphenyl methane
bromotris(4-biphenylyl) methane
bromotris(4'CY-methyl-4-biphenylyl) methane
chlorobis(m-chlorophenyl)phenyl methane
chlorobis(p-chlorophenyl)phenyl methane
chlorobis(p-diphenylaminophenyl)phenyl methane
chlorobis(m-fluorophenyl)phenyl methane
chlorobis(p-fluorophenyl)phenyl methane
chlorobis(o-methoxyphenyl)phenyl methane
chlorobis(N-methylanilinophenyl)phenyl methane
chloro(m-chlorophenyl)diphenyl methane
chloro(o-chlorophenyl)diphenyl methane
chloro-p-cumyldiphenyl methane
chloro-p-cumyl(p-ethylphenyl)p-tolyl methane
chloro(p-dimethylaminophenyl)-(p-diphenylaminophenyl)-phenyl methane
chloro(p-dimethylaminophenyl)-(p-N-methylanilinophenyl)-phenyl methane
chlorodiphenyl(p-propylphenyl) methane
chlorodiphenyl-m-tolyl methane
chlorodiphenyl-o-tolyl methane
chlorodiphenyl-2,5-xylyl methane
chloro(o-ethylphenyl)diphenyl methane
chloro(p-ethylphenyl)phenyl-p-tolyl methane
chloro(m-fluorophenyl)diphenyl methane
chloro(o-fluorophenyl)diphenyl methane
chloro(p-fluorophenyl)diphenyl methane
chloro(p-iodophenyl)diphenyl methane
chloro(p-isobutylphenyl)diphenyl methane
chloro(o-methoxyphenyl)-(p-methoxyphenyl)phenyl methane
chloro(3,4-methylenedioxyphenyl)diphenyl methane
chlorophenyldi-m-tolyl methane
chlorophenyldi-o-tolyl methane
chloro-m-tolyldi-p-tolyl methane
chlorotri-p-cumyl methane
chlorotriphenyl methane
chlorotris(m-chlorophenyl) methane
chlorotris(m-fluorophenyl) methane
chlorotris(p-fluorophenyl) methane
chlorotris(m-methoxyphenyl) methane
chlorotris(p-N-methylanilinophenyl) methane
chlorotris(4'-methyl-4-biphenylyl) methane
chlorotri-m-tolyl methane
chlorotri-o-tolyl methane
chlorotri-p-tolyl methane
chlorotri-2,3(2,4-, 2,5- and 3,5)-xylyl methane
chlorotri-3,5-xylyl methane
3(and 4)-biphenylylchlorodiphenyl methane
bis[3(and 4)-biphenylyl]chlorophenyl methane
bis(4-biphenylyl)chlorophenyl methane
(p-bromophenyl)bis(tert-butylphenyl)chloro methane
chloro(o-chlorophenyl)di-p-tolyl methane
chloro(p-chlorophenyl)di-p-tolyl methane
chlorodiphenyl-p-tolyl methane
chloro(p-nitrophenyl)diphenyl methane
chlorophenyldi-p-tolyl methane
chlorotris(p-cyclohexylphenyl) methane
chlorotris(o-ethylphenyl) methane
chlorotris(p-methoxyphenyl) methane
chlorotris(p-chlorophenyl) methane
chlorotris(p-nitrophenyl) methane
bromobis(p-methoxyphenyl)phenyl methane
chloro(o-chlorophenyl)bis(p-chlorophenyl) methane
chloro(p-neopentylphenyl)diphenyl methane B. When the diarylmethyl halides of table II below are used in place of chlorotris(m-fluorophenyl) methane in the above example, the corresponding diarylmethyl mercaptans are obtained.

TABLE II chloro(3,4-dimethyoxyphenyl)-(2,4,6-trimethoxyphenyl) methane chlorobis(p-chlorophenyl) methane
chlorobis(p-phenylphenyl) methane
chloro(m-chlorophenyl)-phenyl methane
chloro(α-naphthyl)phenyl methane
chloro(β-naphthyl)phenyl methane
chloro(p-chlorophenyl)phenyl methane
chlorodi-p-tolyl methane
chloro(p-ethylphenyl)phenyl methane
chloro(p-phenoxyphenyl)phenyl methane
chlorophenyl(p-phenylphenyl) methane
chlorophenyl-m-tolyl methane
bromo-(m-fluorophenyl)phenyl methane
bromo(o-fluorophenyl)phenyl methane
chlorobis(p-methoxyphenyl) methane
chlorobis(2,4,6-triethylphenyl) methane
chlorodimesityl methane
chlorodiphenyl methane
chlorodi-m-tolyl methane
chlorodi-o-tolyl methane
chlorodi-2,4-xylyl methane
chlorodi-2,6-(3,5)-xylyl methane
chloromesityl-o-tolyl methane
chloromesityl-2,6-xylyl methane
chlorophenyl(2,3,4,6-tetramethylphenyl) methane
chlorophenyl-p-tolyl methane
chloro-o-tolyl-2,6-xylyl methane
bromobis(p-bromophenyl) methane
bromobis(p-fluorophenyl) methane
bromo(o-bromophenyl)phenyl methane
bromo(p-bromophenyl)phenyl methane
(p-bromophenyl)chloro(p-chlorophenyl) methane
(p-bromophenyl)chlorophenyl methane
bromophenyl-p-tolyl methane
bromophenyl-2,3(2,4-, 2,5-, 3,4-)-xylyl methane
chloro(p-chlorophenyl)-(2,4-dichlorophenyl) methane
chloro(o-chlorophenyl)phenyl methane
chloro(chlorophenyl)-p-tolyl methane
chloro[2,4(and 3,4-dichlorophenyl]phenyl methane
chloro(3,4-diethylphenyl)phenyl methane
chloro(p-iodophenyl)phenyl methane
chloromesitylphenyl methane
chloro(p-nitrophenyl)phenyl methane
bromodi-2,5-xylyl methane
chlorobis(3,4-dimethoxyphenyl) methane
chlorobis(p-nitrophenyl) methane
chloro-m-cumenylphenyl methane
chloro-o-cumenylphenyl methane
chloro-p-cumenylphenyl methane
chloro(m-ethylphenyl)phenyl methane
chloro(o-ethylphenyl)phenyl methane
chloro(p-fluorophenyl)phenyl methane
chloro(p-hexylphenyl)phenyl methane
chlorophenyl-o-tolyl methane
chlorophenyl(3,4,5-trimethylphenyl) methane
chlorophenyl-2,6-xylyl methane
chlorophenyl-3,5-xylyl methane
chloro-o-tolyl-p-tolyl methane
chloro-p-tolyl-2,6-xylyl methane
chlorobis(2,6-diethylphenyl) methane
chlorobis(2,6-diisopropylphenyl) methane
chlorobis(o-ethylphenyl) methane
chloro-o-cumenyl(2,6-diisopropylphenyl) methane
chlorodi-o-cumenyl methane
chloro(2,6-diethylphenyl)-(o-ethylphenyl) methane
chloro(2,6-diethylphenyl)phenyl methane
chloro(2,6-diisopropylphenyl)phenyl methane
chloro(o-chlorophenyl)-(p-chlorophenyl) methane
chlorobis(2,4,6-trichlorophenyl) methane
chloro(p-chlorophenyl)-(p-nitrophenyl) methane
chloro(p-fluorophenyl)-(p-nitrophenyl) methane
chloro(p-methoxyphenyl)-(p-phenoxyphenyl) methane
chloro(p-nitrophenyl)-p-tolyl methane
bromo(o-nitrophenyl)phenyl methane

EXAMPLE 2

2-[Tris-(m-fluorophenyl)methylthio-]1,1-dimethoxybutane

To a solution of 1.15 grams of sodium (0.05 mole) in 100 cc. of absolute ethanol which is stirred under nitrogen, is added 0.05 mole of tris-(m-fluorophenyl)methyl mercaptan. The reaction mixture is then cooled and added to it is 0.05 mole of 2-chloro-1,1-dimethoxybutane. The reaction mixture is slowly heated to reflux and is then refluxed for 3 hours. The reaction mixture is cooled, concentrated, treated with 300 cc. of water and extracted well with chloroform. The combined chloroform extracts are washed well with water, dried over sodium sulfate and concentrated. Chromatography of the residue on 1,500 grams of silica gel and elution with ether-petroleum ether (0–90percent) gives 2-[tris-(m-fluorophenyl)methylthio]-1,1-dimethoxy-butane.

A. When 2-chloro-1,1-dimethoxybutane in the procedure above is replaced by the haloacetals of table I below, the corresponding arylmethylthio acetals are obtained.

TABLE I 2-bromo-1,1-dimethoxypropane
2-chloro-1,1-dimethoxybutane
2-bromo-1,1-dimethoxy-2-phenylethane
2-bromo-1,1-dimethoxy-2-methylpropane
2-bromo-1;1-dimethoxy-2-phenylpropane B. When tris-(m-fluorophenyl)methyl mercaptan in the procedure above is replaced by the triarylmethyl mercaptans described in example 1, or by the diarylmethyl mercaptans described in example 1, or by the benzyl mercaptans from table II below, the corresponding arylmethylthio acetals are obtained.

TABLE II

The following benzyl mercaptans are prepared from the corresponding halide according to the procedure described in example 1.

benzyl mercaptan
m-nitrobenzyl mercaptan
p-nitrobenzyl mercaptan
o-methylbenzyl mercaptan
m-methylbenzyl mercaptan
p-methylbenzl mercaptan
2,4-dimethylbenzyl mercaptan
3,4-dimethylbenzyl mercaptan
o-chlorobenzyl mercaptan
m-chlorobenzyl mercaptan
p-chlorobenzyl mercaptan
2,4-dichlorobenzyl mercaptan
3,4-dichlorobenzyl mercaptan
2,4,5-trichlorobenzyl mercaptan
2-chloro-5-nitrobenzyl mercaptan
5-amino-2,4-dichlorobenzyl mercaptan
p-bromobenzyl mercaptan
o-bromobenzyl mercaptan
o-aminobenzyl mercaptan
3-amino-4-methoxybenzyl mercaptan
o-methylaminobenzyl mercaptan
p-methoxybenzyl mercaptan
4-methoxy-3-nitrobenzyl mercaptan
3,4-dimethoxybenzyl mercaptan
3,4-methylenedioxybenzyl mercaptan; or
4-phenylbenzyl mercaptan
p-chloro-α-phenethyl mercaptan
p-trifluoromethylbenzyl mercaptan
p-cyanobenzyl mercaptan
p-dimethylsulfonylbenzyl mercaptan
p-trifluoroacetylbenzyl mercaptan
4-benzyloxybenzyl mercaptan
2-hydroxy-4-nitrobenzyl mercaptan
2,3,4,5,6-pentafluorobenzyl mercaptan
2-methylbenzyl mercaptan
3-methylbenzyl mercaptan 4-methylbenzyl mercaptan
2,5-dimethylbenzyl mercaptan
3,4-dimethylbenzyl mercaptan
3,5-dimethylbenzyl mercaptan
2-nitrobenzyl mercaptan
4-nitrobenzyl mercaptan
2-fluorobenzyl mercaptan
3-fluorobenzyl mercaptan
4-fluorobenzyl mercaptan
4-bromobenzyl mercaptan
4-phenylbenzyl mercaptan
4-carboxybenzyl mercaptan
o-methoxybenzyl mercaptan
m-methoxybenzyl mercaptan
p-methoxybenzyl mercaptan
2,3-dimethoxybenzyl mercaptan
3,4-dimethoxybenzyl mercaptan
α-naphthylbenzyl mercaptan
α-naphthylmethyl mercaptan
4-mercaptomethyl-α-phenyl pyridine
2-mercaptomethyl-α-phenylthiophene
2-mercaptomethyl-α-phenyl pyridine

EXAMPLE 3

2-[Tris-(m-fluorophenyl)methylthio]-butyraldehyde

A mixture of 0.05 mole of 2-[tris-(m-fluorophenyl)methylthio]-1,1-dimethoxybutane and 300 cc. of 1 N sulfuric acid is refluxed under nitrogen for three hours. The reaction mixture is cooled, and extracted well with chloroform. The combined chloroform extracts are washed well with water, dried over sodium sulfate and concentrated. Chromatography of the residue on 1600 grams of silica gel and elution with ether-petroleum ether (0–90percent) gives 2-[tris-(m-fluorophenyl)methylthio]-butyraldehyde.

A. When 2-[tris-(m-fluorophenyl)methylthio]-1,1-dimethoxybutane is replaced in the procedure described above by the arylthiomethyl acetals prepared in example 2, the corresponding arylmethylthio aldehydes are obtained.

EXAMPLE 4

2-[Tris-(m-fluorophenyl)methylthio]-butyrophenone -butyrophenone

When 2-chlorobutyrophenone is used in place of 2-chloro-1,1-dimethoxybutane in the procedure of example 2, there is obtained 2-[tris-(m-fluorophenyl)-methylthio]-butyrophenone.

A. When 2-chlorobutyrophenone in the procedure above is replaced by the halo ketones of table I below, and when tris(m-fluorophenyl)methyl mercaptan in the above procedure is replaced by the mercaptans as shown in example 2, the corresponding thio ketones are obtained.

TABLE I 1-chloro-2-propanone
3-bromo-2-butanone
3-chloro-2-pentanone
1-chloro-1-phenyl-2-propanone
1-chloro-2-butanone
2-chloro-3-pentanone
4-chloro-3-hexanone
1-bromo-1-phenyl-2-butanone
2-chloroacetophenone
2-bromo-2-phenylacetophenone
3-chloro-3-methyl-2-butanone
2-bromo-2-methyl-3-pentanone
2-chloro-2-methylpropiophenone

EXAMPLE 5

S-tris(m-fluorophenyl)methyl-β-ethyl-DL-cysteine

Forty grams (0.10 mole) of 2- [tris-(m-fluorophenyl)methylthio] butyraldehyde is added during about 30 minutes to a well-stirred mixture of 11.5 grams of ammonium chloride, 10.4 grams of sodium cyanide, 70 ml. of concentrated aqueous ammonia solution, and 40 ml. of ethanol saturated with gaseous ammonia. Stirring is continued overnight at room temperature. The reaction mixture is extracted with ether, and the ethereal solution evaporated in vacuo, giving the corresponding amino nitrile intermediate as an oily residue. The crude oil is hydrolyzed by refluxing with 60 ml. of concentrated hydrochloric acid for 2.5 hours. The solution is evaporated to dryness, the residue is dissolved in water, and the pH adjusted to about 6 by the addition of concentrated aqueous ammonia. The precipitate is collected by filtration, washed well with cold water, and crystallized from boiling water. On cooling, S-tris-(m-fluorophenyl)methyl-β-ethyl-DL-cysteine is obtained.

A. When 2-[tris-(m-fluorophenyl)methylthio]-butyraldehyde is replaced in the above procedure by the arylmethylthio aldehydes described in example 3, or by the arylmethylthio methyl ketones described in example 4, the corresponding S-arylmethyl cysteines are obtained.

EXAMPLE 6

S-tris-(m-fluorophenyl)methyl-β-ethyl-α-phenyl-DL-cysteine

A suspension of 47.7 grams (0.10 mole) 2- [tris-(m-fluorophenyl)methylthio] butyrophenone in 300 ml. of absolute ethanol is stirred at 60° until all the solid dissolves. A solution of 10 grams of potassium cyanide in 100 ml. of water is added with continued stirring, followed by 60 grams of solid ammonium carbonate. The mixture is stirred at 60°–70° for 48 hours. The resulting clear, yellow solution is poured on about 400 grams of crushed ice, and the mixture acidified carefully with hydrochloric acid. The precipitated solid is separated by filtration, washed thoroughly with water, and dried. Crystallization from hot ethanol gives 5-(α-[tris-(m-fluorophenyl)methylthio]-propyl-5-phenyl hydantoin.

A mixture of the hydantoin together with 85 grams of barium hydroxide (dried) and 700 ml. of water is heated at reflux with stirring for 7 days. The hot mixture is acidified carefully with concentrated hydrochloric acid to dissolve precipitated barium salts. The product, S-tris-(m-fluorophenyl)methyl-α-ethyl-α-phenyl-DL-cysteine, is insoluble in the aqueous medium; after cooling, it is separated by filtration, washed thoroughly with water, and allowed to air-dry. Purification of the crude solid is effected through solution in hot, dilute sulfuric acid, filtration to remove insoluble impurities, and reprecipitation by the dropwise addition of concentrated aqueous ammonia.

A. When 2-[tris-(m-fluorophenyl)methylthio]butyrophenone is replaced in the above-described procedure by the thio ketones prepared in example 4, the corresponding S-arylmethyl cysteines are obtained.

EXAMPLE 7

S-(p-chlorophenyldiphenylmethyl)-L-cysteine

To a stirred mixture of 6.05 g. (0.05 mole) of L-cysteine in about 150 ml. of refluxing liquid ammonia is added, portionwise, 15.6 g. (0.05 mole) of chloro-(p-chlorophenyl)diphenylmethane. The reaction mixture is stirred until a clear solution results at which time the ammonia is allowed to evaporate. The mixture is then treated with water and the product is separated from the aqueous and washed thoroughly with cold water-ether, and filtered. The product is collected by filtration (m.p. 160°–162° C.).

A. When the triarylmethyl halides and diarylmethyl halides from example 1 are used in place of chloro-(p-chlorophenyl)diphenyl methane in the procedure above, then the corresponding cysteine products are obtained.

B. When the corresponding benzyl halides of the benzyl mercaptans of example 2 are used in place of chloro-(p-chlorophenyl)diphenyl methane in the procedure above, the corresponding cysteine products are obtained.

C. When the cysteines of table I below are used in place of L-cysteine in examples 7, 7 A and 7B, the corresponding cysteine products are obtained.

TABLE I

α-methyl cysteine
β-methyl cysteine
α,β-dimethyl cysteine
ββ-dimethyl cysteine
αββ-trimethyl cysteine
β-ethyl cysteine
α-phenyl cysteine
β-phenyl cysteine
α-methyl-β-phenyl cysteine
N-ethyl cysteine
N,N-dimethyl cysteine
N-phenyl cysteine
  yl cysteine
N,N-dimethyl-β-phenyl cysteine
N-guanyl cysteine D. When chloro-(2-thienyl)diphenyl methane is used in place of the substituted halo methane in the procedures above, the corresponding (2-thienyl)cysteines are prepared.

EXAMPLE 8

S-(p-chlorophenyldiphenylmethyl)-L-cysteine

To a stirred mixture of 8.4 grams (0.05 mole) of β-bromo-α-amino propionic acid in about 150 ml. of refluxing liquid ammonia, is added, portionwise, 15.5 grams (0.05 mole) of mercapto-(p-chlorophenyl)-diphenylmethane. The reaction mixture is stirred until a clear solution results, a which time the ammonia is allowed to evaporate. The mixture is then treated with water and the product is separated from the aqueous and washed thoroughly with cold water-ether and filtered. The product is collected by filtration (m.p. 160°–162° C.).

A. When the triarylmethyl mercaptans, diarylmethyl mercaptans, and benzyl mercaptans of examples 1 and 2 are used in place of mercapto-(p-chlorophenyl)-diphenyl methane in the procedure above, the corresponding cysteine products are obtained.

B. When the β-halo-α-aminopropionic acids of table I below are used in place of β-bromo-α-amino-propionic acid in examples 8 and 8A, the corresponding cysteine products are obtained.

TABLE I

β-chloro-α-dimethylaminopropionic acid
β-chloro-α-methyl-α-aminopropionic acid
β-bromo-β,β-diethyl-α-aminopropionic acid
β-bromo-β-phenyl-α-aminopropionic acid
β-bromo-α-phenyl-α-aminopropionic acid
β-chloro-α,β-dimethyl-α-aminopropionic acid
β-chloro-α-phenyl-α-dimethylaminopropionic acid
β-chloro-α-acetamidopropionic acid
β-chloro-α-guanidinopropionic acid C. When mercapto-(4-pyridyl)diphenyl methane is used in place of the substituted mercapto methane in the procedures above, the corresponding (4-pyridyl)-cysteines are prepared.

EXAMPLE 9 p-Chlorophenyldiphenyl carbinol 18.7 grams of chloro(p-chlorophenyl)diphenyl methane is refluxed with 8.3 grams of potassium carbonate in 50 ml. of water for 5 hours. The mixture is then evaporated and the residue acidified with dilute HCl. This is then extracted with ether, dried and evaporated to dryness.

A. When the triarylmethyl halides from example 1 are used in place of chloro-(p-chlorophenyl)diphenyl methane in the procedure above, the corresponding alcohol products are obtained.

EXAMPLE 10

S-(p-chlorophenyldiphenylmethyl)-L-cysteine

To a stirred solution of p-chlorophenyldiphenyl carbinol (2.95 grams, 0.010 mole) in glacial acetic acid (10 ml.), is added anhydrous L-cysteine hydrochloride (1.58 grams, 0.010 mole). The mixture is heated to 60° C., in an oil bath, and then boron trifluoride etherate (1.4 ml., 10 percent excess) is added. The temperature is raised to 80°–85° C., and the reaction is allowed to continue, with stirring, for 45 minutes. The mixture is allowed to cool to room temperature, and then to stand for 15 minutes longer.

The reaction mixture is transferred to a beaker with the aid of ethanol (15 ml.), water (5 ml.) and anhydrous sodium acetate (3 grams) are added with stirring, and the mixture is finally treated slowly with water (100 ml.) to precipitate the product as a tacky, pale yellow gum. The supernate is decanted, and the residue triturated vigorously with ice-water until it solidifies. The solid is transferred to a sintered glass funnel, and washed thoroughly by slurrying with water. After being sucked as dry as possible, it is washed thoroughly with ether. The yield of nearly colorless solid, homogeneous by TLC ($R_f$ 0.85; 3:1:1 w/w n-butanol-acetic acid-water on silica gel G), is 3.2 gram (80 percent), m.p. 160°–162° C., dec.

A. When each of the triarylmethyl halides from example 9 are substituted for p-chlorophenyldiphenyl carbinol in the procedure above, then the corresponding cysteine is prepared

EXAMPLE 11

S-tris-(m-fluorophenyl)methyl-β-ethyl-DL-cysteine methyl ester hydrochloride

To 200 ml. of anhydrous methanol is added 44.6 grams (0.10 mole) of S-tris-(m-fluorophenyl)methyl-β-ethyl-DL-cysteine. A slow stream of dry hydrogen chloride gas is passed in while the mixture is maintained at gentle reflux with stirring for 3 hours. The resulting solution is evaporated in vacuo, and the residue is crystallized from a mixture of methanol and ether, giving S-tris-(m-fluorophenyl)methyl-β-ethyl-DL-cysteine methyl ester hydrochloride.

A. When methanol is replaced in the procedure described above by an inert solvent such as dimethoxyethane, THF and an alcohol such as ethanol, n-propanol, but-2-enol, but-2-ynol, cyclopropylmethanol, 2-ethylpropanol, 2-dimethylaminoethanol, 2-hydroxymethylpiperidine, 1-hydroxyethylpyrrolidine, 2-hydroxypropylmorpholine, 1-methyl-2-hydroxymethylpiperidine, N-hydroxymethyl-N'-ethylpiperazine, phenol, p-acetamidophenol, 2-phenylpropanol. 2-carbamylphenol, 2-(p-methoxyphenyl)-propanol, 2-phenylbut-3-enol, tetrahydrofurfural, 2-dimethylaminocyclohexanol, and S-tris-(m-fluorophenyl)methyl-β-ethyl-DL-cysteine by the S-arylmethyl cysteines prepared in examples 5–10, then the corresponding amino acid ester hydrochlorides are obtained.

EXAMPLE 12

S-tris-(m-fluorophenyl)methyl-β-ethyl-DL-cysteineamide hydrochloride

To 250 ml. of methanol saturated at 0° C., with ammonia, is added 49.6 grams (0.10 mole) of S-tris-(m-fluorophenyl)methyl-β-ethyl-DL-cysteine methyl ester hydrochloride. The resulting solution is allowed to stand for 4 days at 20° C. The solvent is evaporated in vacuo, and the residue crystallized from a mixture of alcohol and ether, giving S-tris-(m-fluorophenyl)methyl-β-ethyl-DL-cysteineamide hydrochloride.

A. When ammonia is replaced in the above procedure by methylamine, ethylamine, propylamine, dimethylamine, ethylpropylamine, glucosamine, glycosylamine, 1-amino-but-3-ene, 2-phenylpropylamine, 2-chloroaniline, 3-bromoaniline, 1-methyl-2-aminoethylpiperidine, tetrahydrofurylamine, 1,2,5,6-tetrahydropyridine, morpholine, N-methylpiperazine, piperazine, N-phenylpiperazine, piperidine, benzylamine, aniline, 2-methoxyaniline, cyclohexylamine, pyrrolidine, N-hydroxyethylpiperazine, 2-dimethylcarbamylpropylamine, 3-diethylaminopropylamine, 1-methyl-2-aminomethylpyrrolidine, carbobenzyloxyethylamine, or dibutylamine and S-tris-(m-fluorophenyl)methyl-β-ethyl-DL-cysteine methyl ester hydrochloride by the amino acid alkyl ester hydrochlorides described in example 11, then the corresponding amide derivatives are obtained.

EXAMPLE 13

S-tris-(m-fluorophenyl)methyl-β-ethyl-N,N-dimethyl-DL-cysteine

A mixture of 11.1 grams (0.025 mole) of S-tris-(m-fluorophenyl)methyl-β-ethyl-DL-cysteine and 9.0 ml. of 40 percent aqueous formaldehyde in 200 ml. of water is hydrogenated in the presence of 11 grams of 10 percent palladium-on-charcoal; the theoretical amount of hydrogen is taken up on shaking overnight at room temperature. The catalyst is removed by filtration, and the filtrate evaporated in vacuo. The residue is taken up in boiling acetone; S-tris-(m-fluorophenyl)methyl-β-ethyl-N,N-dimethyl-DL-cysteine deposits on cooling.

A. When S-tris-(m-fluorophenyl)methyl-β-ethyl-DL-cysteine is replaced in the above-described procedure by the S-arylmethyl cysteines prepared in examples 5–10, then the corresponding N,N-dimethyl derivatives are obtained.

EXAMPLE 14

αGuanidino-β-[S-tris-(m-fluorophenyl)methylthio]valeric acid

A solution of 26.7 grams (0.06 mole) of S-tris-(m-fluorophenyl)methyl-β-ethyl-DL-cysteine in 100 ml. of water and 30 ml. of concentrated aqueous ammonia is treated with 27.8 grams (0.10 mole) of S-methyl isothiourea sulfate, added in small portions with vigorous stirring during about 30 minutes. The resulting solution is stirred for 20 hours at room temperature. The crystallized product is collected after thorough cooling of the reaction mixture, and is washed with water and alcohol. Crystallization from a mixture of water and alcohol gives pure α-guanidino-β-[S-tris-(m-fluoro-phenyl)methylthio] valeric acid.

A. When the S-tris-(methyl-β-ethyl-DL-cysteine of the above example is replaced by any of the S-arylmethyl cysteines having $R_\alpha=H$, prepared in examples 5 to 10, then the corresponding α-guanidino-β-(S-arylmethylthio)carboxylic acids are obtained.

EXAMPLE 15

S-tris-(m-fluorophenyl)methyl-β-ethyl-N-methyl-DL-cysteine
I. di-p-Toluenesulfonyl-β-ethyl-DL-cystine To a solution of 0.05 mole of S-tris-(m-fluorophenyl)methyl-β -ethyl-DL-cysteine in 400 ml. of liquid ammonia is added small pieces of sodium metal, slowly and with stirring, until a permanent blue color appears. The color is just discharged with ammonium chloride, and then additional ammonium chloride, equivalent to the amount of sodium used, is added. The reaction mixture is left overnight to allow the ammonia to evaporate. The residue is dissolved in water, and the solution extracted thoroughly with ether. The pH of the aqueous phase is adjusted to about 8, a trace of ferric chloride is added, and the solution is aerated overnight. The pH is then adjusted to 6, and the solution evaporated to small volume when β-ethyl-DL-cystine crystallizes.

A solution of 14.8 grams (0.05 mole) of β-ethyl-DL-cystine in 100 ml. of 1 N aqueous sodium hydroxide is stirred vigorously while a solution of 38 grams of p-toluenesulfonyl chloride in 100 ml. of ether is added in ten portions at 15 minute intervals; each portion is preceded by addition of 10 ml. of 2 N aqueous sodium hydroxide solution. When the addition is complete, the mixture is stirred for 30 minutes more. The ether layer is removed, and the aqueous layer is extracted with 100 ml. of fresh ether. Dissolved ether is removed from the aqueous phase by warming, and then the warm solution is acidified by the addition, with vigorous shaking, of concentrated hydrochloric acid. Di-p-toluenesulfonyl-β-ethyl-DL-cystine crystallizes, and after thorough cooling, is collected by filtration.

A. When the S-arylmethyl cysteines prepared in examples 5 to 10 are used in place of S-tris-(m-fluorophenyl)methyl-β -ethyl-DL-cysteine in the procedure above, there is obtained the corresponding di-p-toluenesulfonyl cystines.

II. S-tris-(m-fluorophenyl)methyl-β-ethyl-N-methyl-DL-cysteine

To 5.5 grams (0.0091 mole) of di-p-toluenesulfonyl-β-ethyl-DL-cystine, dissolved in 55 ml. of 1 N aqueous sodium hydroxide solution, is added 2.3 ml. of methyl iodide. After being warmed to about 70° C., the mixture is shaken vigorously until the methyl iodide layer disappears. When the solution cools, it is extracted with ether. The aqueous layer is overlaid with 100 ml. of ether and strongly acidified with hydrochloric acid. The aqueous layer is then reextracted with small portions of ether until it gives a negative test for disulfide. The combined ether extracts are washed with water containing a small amount of sodium bisulfite, and evaporated in vacuo. The residue is taken up in about 200 ml. of liquid ammonia, and sodium is added in small pieces with stirring until a permanent blue color remains; excess sodium is destroyed with ammonium chloride [in some cases where the arylmethyl halide is so reactive that solvolysis is the principal reaction in liquid ammonia (notably with trityl halides), the procedure must be modified at this point by allowing the ammonia to evaporate and replacing it with dimethylformamide], and 6.7 grams (0.02 mole) of chloro-tris-(m-fluorophenyl) methane is added slowly. The ammonia is allowed to evaporate, and 50 ml. of ice water is added to the residue. The resulting solution is extracted twice with ether, and then acidified to pH about 6 with hydrochloric acid. The precipitate of S-tris-(m-fluorophenyl)methyl-β-ethyl-N-methyl-DL-cysteine is collected by filtration, and washed successively with water, alcohol, and ether.

A. When the di-p-toluenesulfonyl cystines prepared in part I above are used in place of di-p-toluenesulfonyl-β-ethyl-DL-cystine, and when the arylmethyl halides of examples 1 and 2 are used in place of chloro-tris-(m-fluorophenyl)methane in part II above, the corresponding S-arylmethyl-N-methyl cysteines are obtained.

B. When ethyl iodide, propyl iodide or butyl iodide is used in place of methyl iodide in part II above, the corresponding S-arylmethyl-N-alkyl cysteines or obtained.

EXAMPLE 16

N,N-diethyl-α-ethyl-S-tris-(m-fluorophenyl)methyl-DL-cysteine hydrochloride

I. α-Diethylamino-α-tris-(m-fluorophenyl)metnythiomethyl butyronitrile

To a concentrated aqueous solution of diethyl-amine hydrochloride is added 0.01 moles of potassium cyanide, followed by 0.01 moles of ethyl-tris-(m-fluorophenyl)methyl ketone.

The reaction mixture is shaken for 48 hours at room temperature and then extracted well with ether. The combined ether extracts are dried over $Na_2SO_4$ and concentrated to yield crude α-diethylamino-α-tris-(m-fluorophenyl)methylthiomethyl butyronitrile.

II. Hydrolysis

A solution of 0.1 mole of α-diethylamino-α-tris-(m-fluorophenyl)methylthiomethyl butyronitrile in 100 ml. of concentrated hydrochloric acid is refluxed for 12 hours and then concentrated to yield N,N-diethyl-α-ethyl-S-tris-(m-fluorophenyl)methyl-DL-cysteine hydrochloride.

A. When dimethylamine hydrochloride, propylethylamine hydrochloride, phenylamine hydrochloride or phenylpropylamine hydrochloride is used in the above example in place of diethylamine hydrochloride, there is obtained the corresponding α-amine substituted compound.

EXAMPLE 17

A mixture of 250 parts of S-trityl-L-cysteine and 25 parts of lactose is granulated with suitable water, and to this is added 100 parts of maize starch. The mass is passed through a 16-mesh screen. The granules are dried at a temperature below 60° C. The dry granules are passed through a 16-mesh screen, and mixed with 3.8 parts of magnesium stearate. They are then compressed into tablets suitable for oral administration.

We claim:
1. A compound of the formula

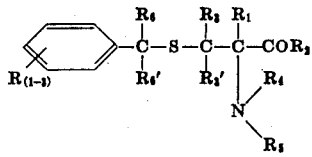

wherein

R is hydrogen or halogen;
$R_1$ is hydrogen, methyl or phenyl;
$R_2$ is hydroxy;
$R_3$, $R_3'$, and $R_5$ are hydrogen; and
$R_6$ and $R_6'$ each may be hydrogen, phenyl, naphthyl, or halophenyl; provided that when R is hydrogen, $R_6$ or $R_6'$ are halophenyl or naphthyl.
2. S-(3,4-dichlorobenzyl)-L-cysteine hydro-chloride.
3. S-(3,4-dichlorobenzyl)-α-methyl cysteine hydrochloride.
4. S-(3,4-dichlorobenzyl)-α-phenyl cysteine hydrochloride.
5. S-[di-(p-chlorophenyl)phenylmethyl]-L-cysteine.
6. S-tris-4-fluorophenyl)methyl-L-cysteine hydrochloride.
7. S-(p-chlorophenyldiphenylmethyl)-L-cysteine hydrochloride.
8. S-(α-napthylphenylmethyl-L-cysteine hydrochloride.

* * * * *

UNITED STATES PATENT OFFICE
CERTIFICATE OF CORRECTION

Patent No. 3,624,143          Dated 11/30/71

Inventor(s) Tsung-Ying Shen and Gordon L. Walford

It is certified that error appears in the above-identified patent and that said Letters Patent are hereby corrected as shown below:

In Column 18, Claim 1, line 4, "$R_3$, $R_3'$, and $R_5$" should read

-- $R_3$, $R_3'$, $R_4$, and $R_5$ --.

Signed and sealed this 2nd day of May 1972.

(SEAL)
Attest:

EDWARD M. FLETCHER, JR.
Attesting Officer

ROBERT GOTTSCHALK
Commissioner of Patents